(12) United States Patent
Kostkin

(10) Patent No.: US 12,310,269 B2
(45) Date of Patent: May 27, 2025

(54) ATTACHMENT SYSTEM FOR AGRICULTURAL EQUIPMENT

(71) Applicant: PEK AUTOMOTIVE D.O.O., Vrhnika (SI)

(72) Inventor: Mikhail Kostkin, Vrhnika (SI)

( * ) Notice: Subject to any disclaimer, the term of this patent is extended or adjusted under 35 U.S.C. 154(b) by 138 days.

(21) Appl. No.: 18/019,739

(22) PCT Filed: Sep. 3, 2020

(86) PCT No.: PCT/IB2020/000683
§ 371 (c)(1),
(2) Date: Feb. 3, 2023

(87) PCT Pub. No.: WO2022/049406
PCT Pub. Date: Mar. 10, 2022

(65) Prior Publication Data
US 2023/0276726 A1    Sep. 7, 2023

(51) Int. Cl.
*A01B 63/00*          (2006.01)

(52) U.S. Cl.
CPC .................. *A01B 63/008* (2013.01)

(58) Field of Classification Search
CPC .................................................. A01B 63/008
See application file for complete search history.

(56) References Cited

U.S. PATENT DOCUMENTS

| | | | | |
|---|---|---|---|---|
| 3,101,794 | A * | 8/1963 | Bechman | A01B 63/00 172/720 |
| 4,970,848 | A * | 11/1990 | Neuerburg | A01B 61/044 56/15.8 |
| 8,413,737 | B2 * | 4/2013 | Oudemans | A01D 75/185 172/449 |
| 8,726,622 | B2 * | 5/2014 | Wagner | F15B 15/261 267/64.12 |
| 9,332,687 | B2 * | 5/2016 | Keigley | A01B 63/32 |
| 9,408,340 | B2 * | 8/2016 | Halter | A01D 34/662 |
| 9,883,621 | B2 * | 2/2018 | Keigley | A01B 63/145 |
| 10,287,745 | B1 * | 5/2019 | Keigley | E02F 3/8157 |
| 10,501,912 | B2 * | 12/2019 | Keigley | E02F 3/7677 |
| 10,674,661 | B2 * | 6/2020 | Merkt | A01D 34/84 |
| 10,820,467 | B2 * | 11/2020 | Luckmann | A01D 34/661 |

(Continued)

FOREIGN PATENT DOCUMENTS

| | | |
|---|---|---|
| CN | 111066400 A | 4/2020 |
| DE | 3106929 A1 | 9/1983 |

(Continued)

*Primary Examiner* — Eret C McNichols
(74) *Attorney, Agent, or Firm* — Patentbar International

(57) ABSTRACT

The invention relates to lifting and adjusting devices for agricultural equipment. The attachment system includes a mounting frame with fastening means for its attachment to the vehicle, and an implement bearing frame capable of vertical movement relative to the mounting frame under the action of lifting devices fixed on the sides of the mounting frame; and a framework located in front of the agricultural implement for installing at least one safety device. By all the design features of the invention, the attachment system enhances the operational efficiency of agricultural equipment by reducing the probability of its damage at obstacle collision, improving operator safety, and preserving the environment.

9 Claims, 6 Drawing Sheets

(56) References Cited

U.S. PATENT DOCUMENTS

| | | | |
|---|---|---|---|
| 11,510,361 B2* | 11/2022 | Matus | H04B 3/544 |
| 11,985,912 B2* | 5/2024 | Jin | A01B 63/008 |
| 12,024,852 B2* | 7/2024 | Keigley | E02F 3/7604 |
| 12,150,398 B2* | 11/2024 | Keigley | A01B 63/145 |
| 2012/0279734 A1 | 11/2012 | Oudemans | |
| 2012/0285050 A1 | 11/2012 | Osgood | |
| 2017/0208733 A1* | 7/2017 | Sterchi | A01B 63/102 |
| 2020/0068774 A1* | 3/2020 | Keigley | A01B 63/145 |
| 2020/0375093 A1* | 12/2020 | Matus | B60W 30/10 |
| 2022/0174871 A1* | 6/2022 | Merkt | A01D 34/84 |

FOREIGN PATENT DOCUMENTS

| | | |
|---|---|---|
| DE | 102018103862 A1 | 8/2019 |
| EP | 3439450 A1 | 2/2019 |
| WO | 2020161001 A1 | 8/2020 |

* cited by examiner

ATTACHMENT SYSTEM FOR AGRICULTURAL EQUIPMENT

RELATED APPLICATIONS

This application is a U.S. National Stage Application of International Patent Application PCT/IB2020/000683 filed on Sep. 3, 2020 which is incorporated herein by reference in its entirety.

FIELD OF THE INVENTION

The invention relates to lifting and adjusting devices for agricultural equipment.

BACKGROUND OF THE INVENTION

Various attachment systems for agricultural equipment are known.

Application DE 102018103862, publication date 2019 Aug. 22, discloses a suspension for agricultural machines having a mounting frame with an implement bearing frame hinged to it. Hydraulic cylinders for moving the mounting frame in two planes are installed between the mounting frame and the implement bearing frame for controlling the elevation and attitude of an agricultural implement as well as for damping its vibration.

Application US 20120285050, publication date 2012 Nov. 15, discloses a suspension for agricultural machines comprising a vehicle-mounted frame and a plow-mounted frame that are drawn together by a lift actuator such as a hydraulic cylinder. The frames are connected with each other by means of slides and pins.

Application CN 111066400, publication date 2020 Apr. 28, discloses a three-point suspension system for a rotary cultivator. The system contains an elevation control node and an angle control node, with the elevation control node comprising a pull bar, a lift arm, and a first hydraulic cylinder. A second hydraulic cylinder is used to control the suspension angle.

The design of a device for attaching implements to mobile machinery disclosed in patent EP 3439450, publication date 2019 Dec. 25, is the closest to the solution claimed herein. The device contains two frameworks. The first framework comprises at least two parallel, vertically spaced apart, laterally extending rails. The second framework is adapted for sliding mostly in the plane of the first framework and is mounted on rails that permit lateral sliding along them. A driver is connected to the first framework and the second framework for driving the second framework laterally back and forth along the rails of the first framework.

SUMMARY OF THE INVENTION

The technical result achieved by the invention consists of enhancing the operational efficiency of an implement attachment system by reducing the probability of agricultural equipment damage at obstacle collisions, improving operator safety, and preserving the environment.

The attachment system for agricultural equipment includes a mounting frame with fastening means for its attachment to the vehicle, and an implement bearing frame capable of vertical movement relative to the mounting frame under the action of lifting devices fixed on the sides of the mounting frame; and a framework located in front of the agricultural implement for installing at least one safety device.

The enhancement of operational efficiency by reducing the probability of agricultural equipment damage at obstacle collisions, improving operator safety, and preserving the environment is provided by all the design features of the invention. The ability of the implement bearing frame to move in the vertical plane relative to the mounting frame under the action of two lifting devices makes it easy to adjust said bearing frame for soil relief and control the elevation of agricultural implements, traveling condition included. Thus, the equipment is protected against possible damage during its operation and/or transportation. The same protection goal is achieved by incorporating a framework for deploying at least one safety device in front of the agricultural equipment. The use of a framework with safety devices in front of agricultural implements also enhances the safety of operational personnel and protects the environment from the impact of implements.

Besides, the mounting frame accommodates connectors for supplying power from the vehicle to lifting devices and agricultural equipment.

Furthermore, the implement bearing frame accommodates a framework with a safety device installed thereupon.

Also, the framework has safety sensors installed thereon.

The attachment system can be deployed at the front and/or rear end of a vehicle.

When the attachment system is installed at the front end of a vehicle, the implement bearing frame is additionally equipped with two levers turnable in the vertical plane, the ends of said levers being pivotally connected to a horizontal beam, which is connected to the support framework of an agricultural implement by means of a damper.

Additionally, the implement bearing frame has a cable system capable of lifting and lowering the rear end of the agricultural implement support framework.

When the attachment system is installed at the rear end of a vehicle, the implement bearing frame additionally contains a hinge element, which enables agricultural implements to turn in the vertical plane when an obstacle is encountered.

In this case, the hinge element is connected by means of a cable to tension spring dampers installed vertically on the implement bearing frame.

DETAILED DESCRIPTION OF THE PREFERRED EMBODIMENTS

Embodiments of the Invention

Figure 1:
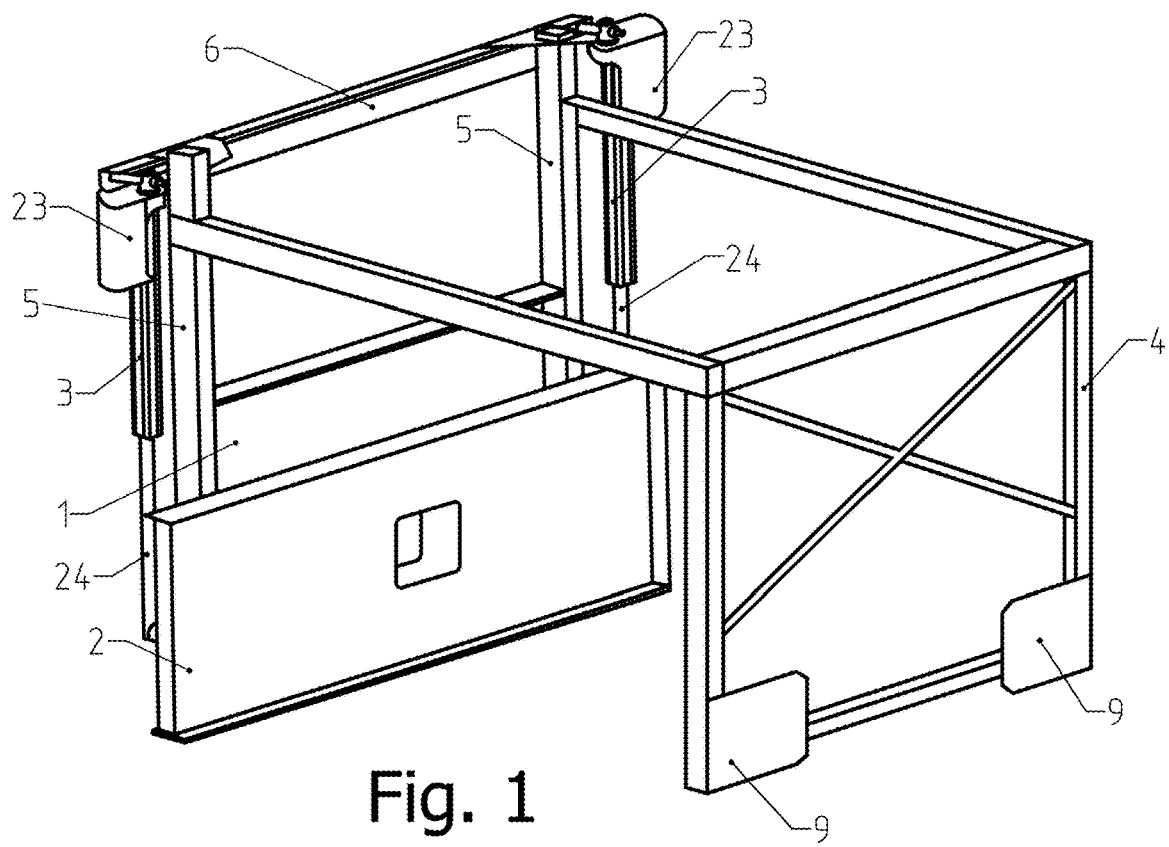
FIG. 1 shows a view of the attached system in operating position.
Figure 2:
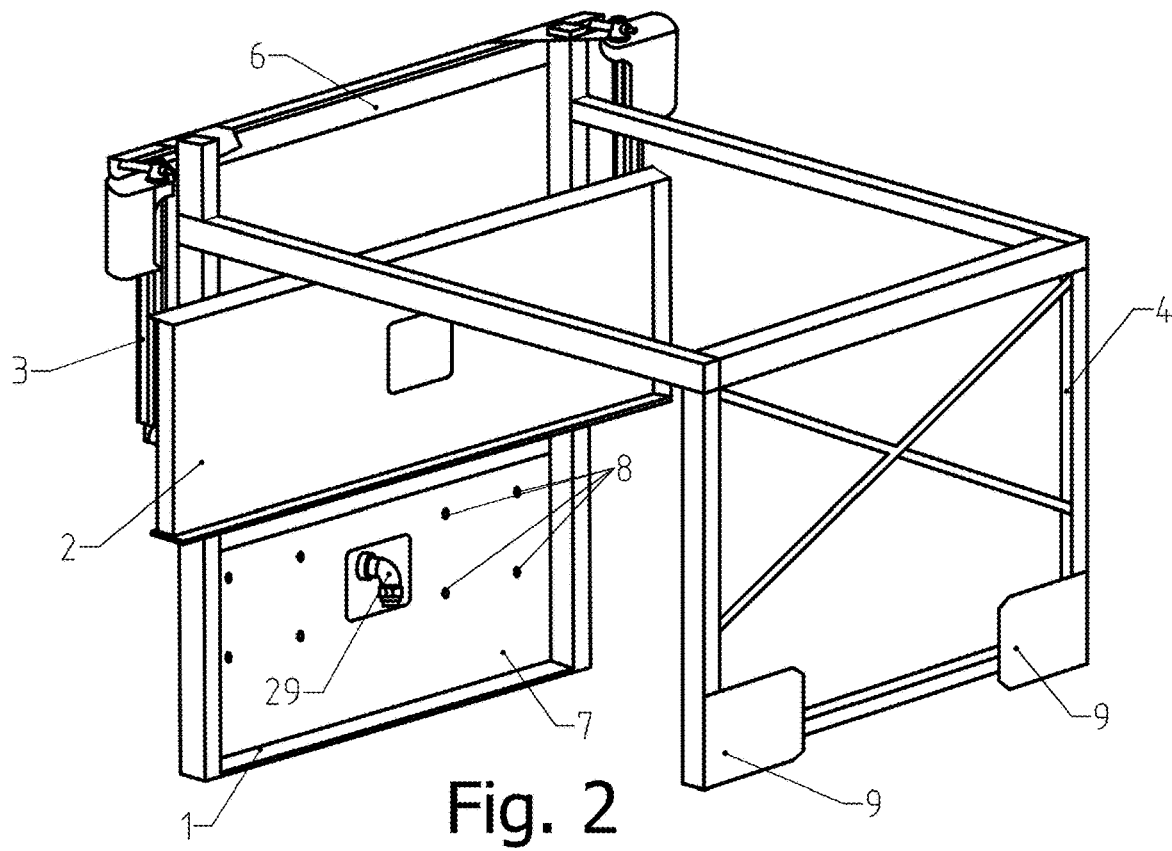
FIG. 2 shows a view of the attachment system in traveling condition.

The attachment system for agricultural equipment includes (FIG. 1-FIG. 2) mounting frame 1 attached to a vehicle at its front and/or rear end. Mounting frame 1 includes two vertical supports 5, horizontal support 6 and mounting plate 7 featuring elements for fastening to a vehicle. In the embodiment shown in FIG. 2, the above-mentioned fastening elements are made in the form of holes 8 (vehicle is not shown in the Figure). Lifting devices 3 are installed on vertical supports 5 of mounting frame 1 for lifting and lowering implement bearing frame 2. This embodiment features electric lifting devices 3 powered from the vehicle. Implement bearing frame 2 can move up and down along rolling or sliding elements of vertical supports 5 under the action of lifting devices 3 driven either electrically or hydraulically. The attachment system also contains framework 4 with pads 9 located in front of the agricultural implement and used for installing at least one safety device. In the present embodiment, framework 4 is fixed to implement bearing frame 2. Pads 9 of framework 4 can accommodate safety devices actuated upon contact with an obstacle, or non-contact safety sensors that warn of obstacles. Different collision protection systems can be simultaneously used to provide safety of agricultural implements, personnel, and environment.

The mounting frame also features electric connectors 29 (FIG. 2) for supplying lifting devices 3 and agricultural implements with power from the vehicle.

Figure 8:
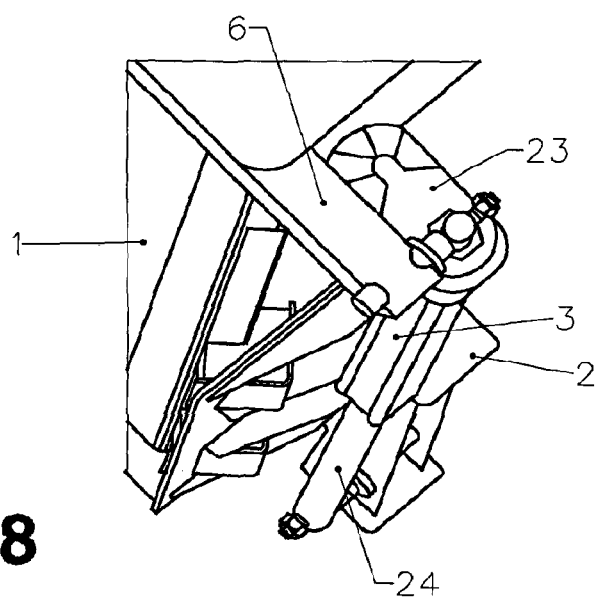
FIG. 8 shows an embodiment of a motion control system for implement bearing frame.

FIG. 8 shows an embodiment featuring sliding elements 26 of vertical supports 5 for lifting and lowering implement bearing frame 2 by means of lifting devices 3 comprising a linear electric drive with electric motor 23 and rod 24.

The application of agricultural equipment attachment system is demonstrated by two examples: with agricultural implements installed at the front end of a vehicle (FIG. 3-FIG. 6) and with the implements located at its rear end (FIG. 7-FIG. 10). The difference between the two applications is, mainly, as follows: for agricultural implements located at the front end of a vehicle the mounting system acts predominantly as a push-type system, while for agricultural implements located at vehicle rear end predominantly as a pull-type system.

Figure 3:
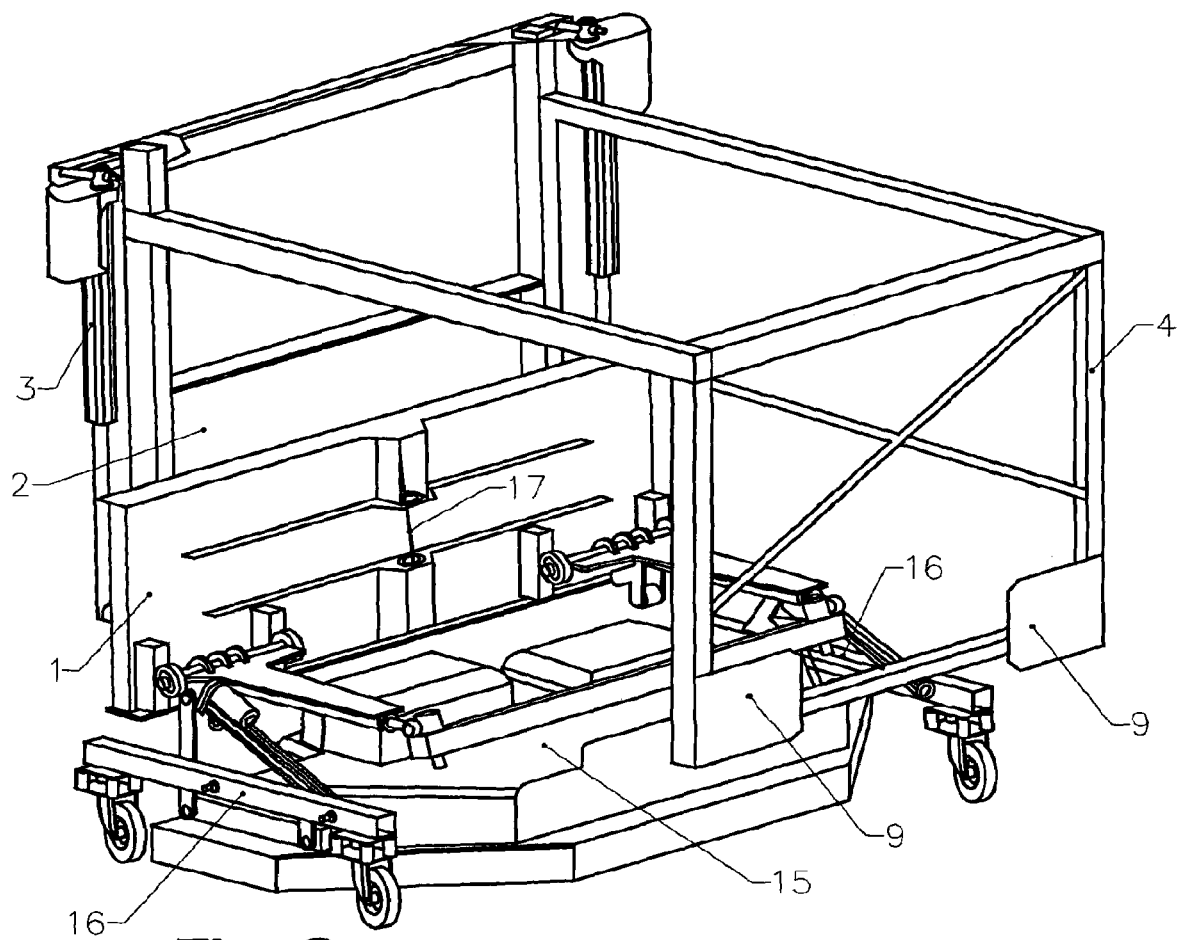
FIG. 3 shows a view of the attachment system installed at the front end of a vehicle.

FIG. 3 shows an example of how a mower attachment system located at vehicle front end operates.

Figure 4:
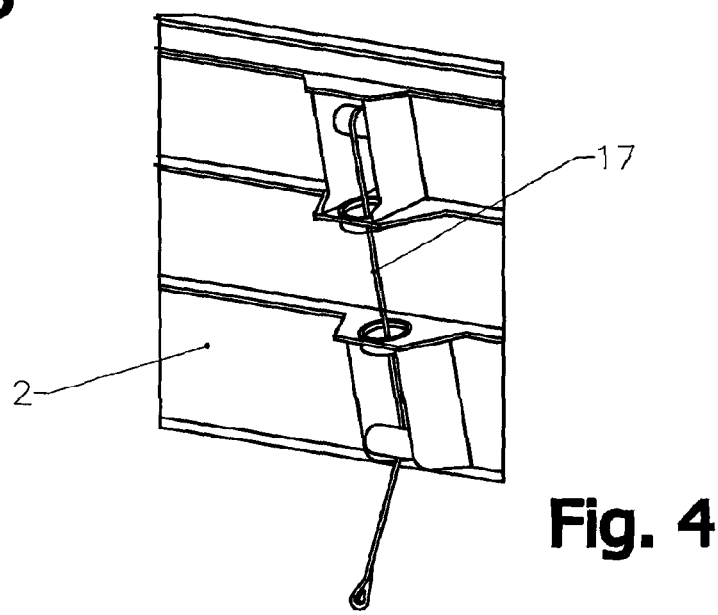
FIG. 4 shows a design of a cable system for lifting and lowering the rear part of agricultural implement support framework.
Figure 5:
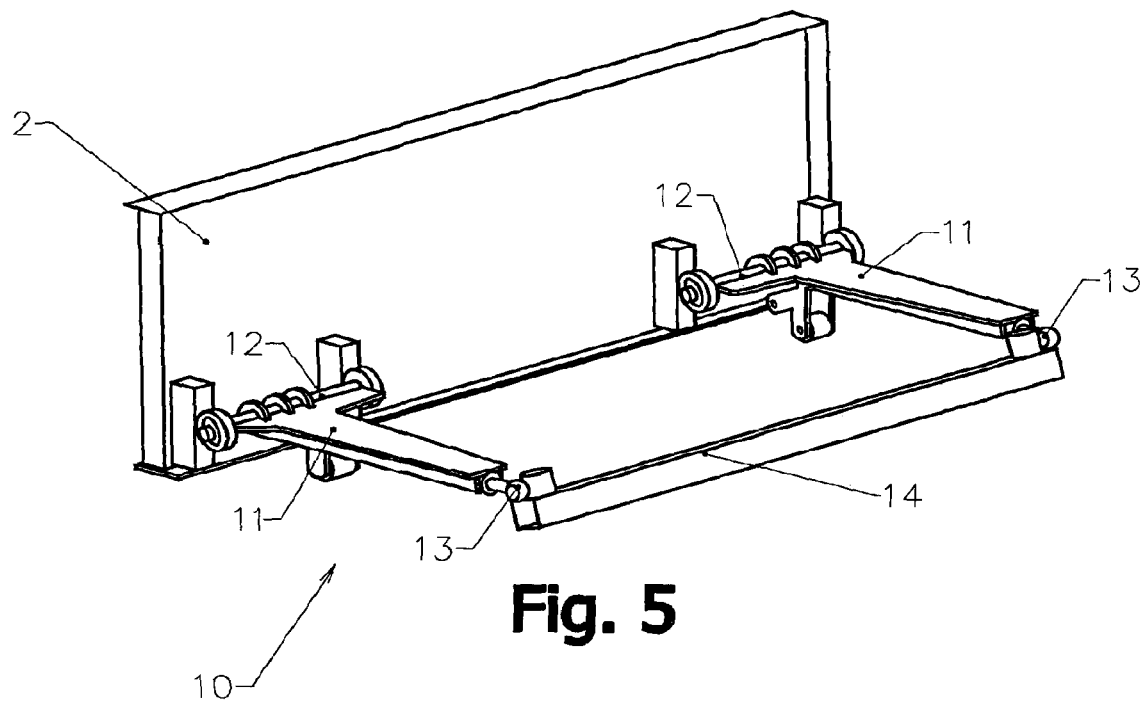
FIG. 5 shows a pivotal device for supporting agricultural implements mounted at the front end of a vehicle.
Figure 6:
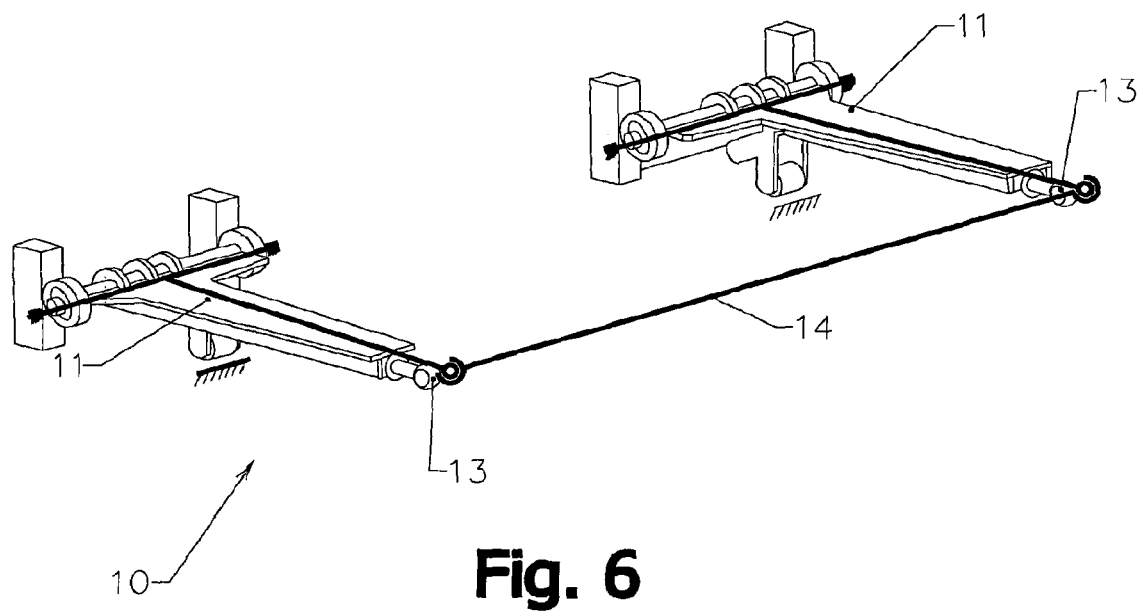
FIG. 6 shows a kinematic diagram of the pivotal device from FIG. 5.

Damping device 10 is installed on implement bearing frame 2 to maintain the mower in required position relative to soil surface. The main elements of damping device 10 are shown in FIG. 5. Damping device 10 includes two levers 11 mounted on axis 12 and capable of turning in the vertical plane. The ends of levers 11 are connected by means of hinges 13 to horizontal beam 14, which is attached to support framework 15 of the mower (FIG. 3) through an additional damper (not shown). The kinematic diagram of damping device 10 is shown in FIG. 6. Furthermore, the matching of mower movement to soil relief is assisted by dollies 16 located on both sides of the mower and fixed on its support framework 15. The supporting, lifting and lowering of the rear part of framework 15 of the mower is achieved through the use of cable system 17 mounted on implement bearing frame 2 (FIG. 3-FIG. 4).

Figure 7:
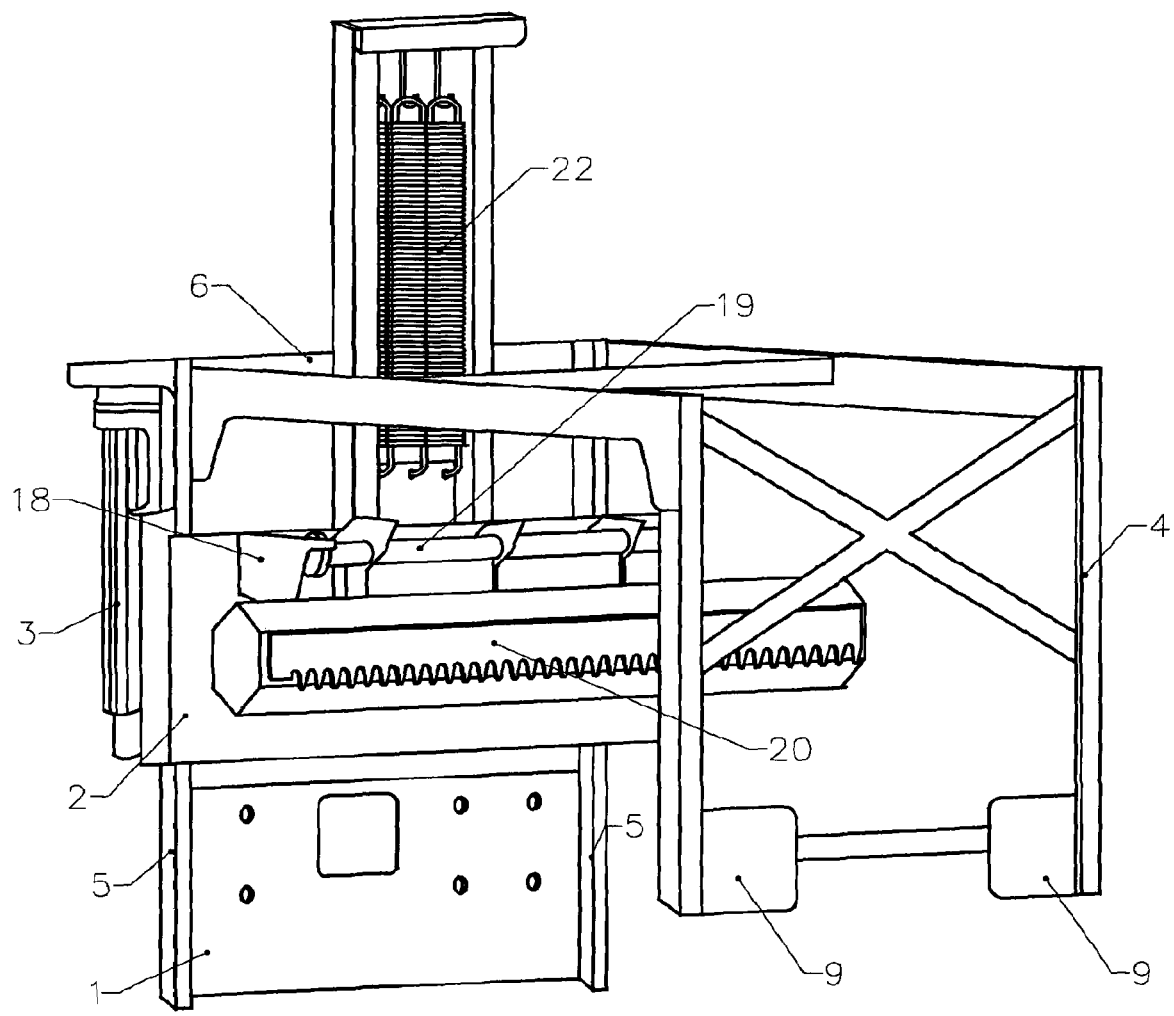
FIG. 7 shows a view of the implement attachment system installed at the rear end of an agricultural vehicle.
Figure 9:
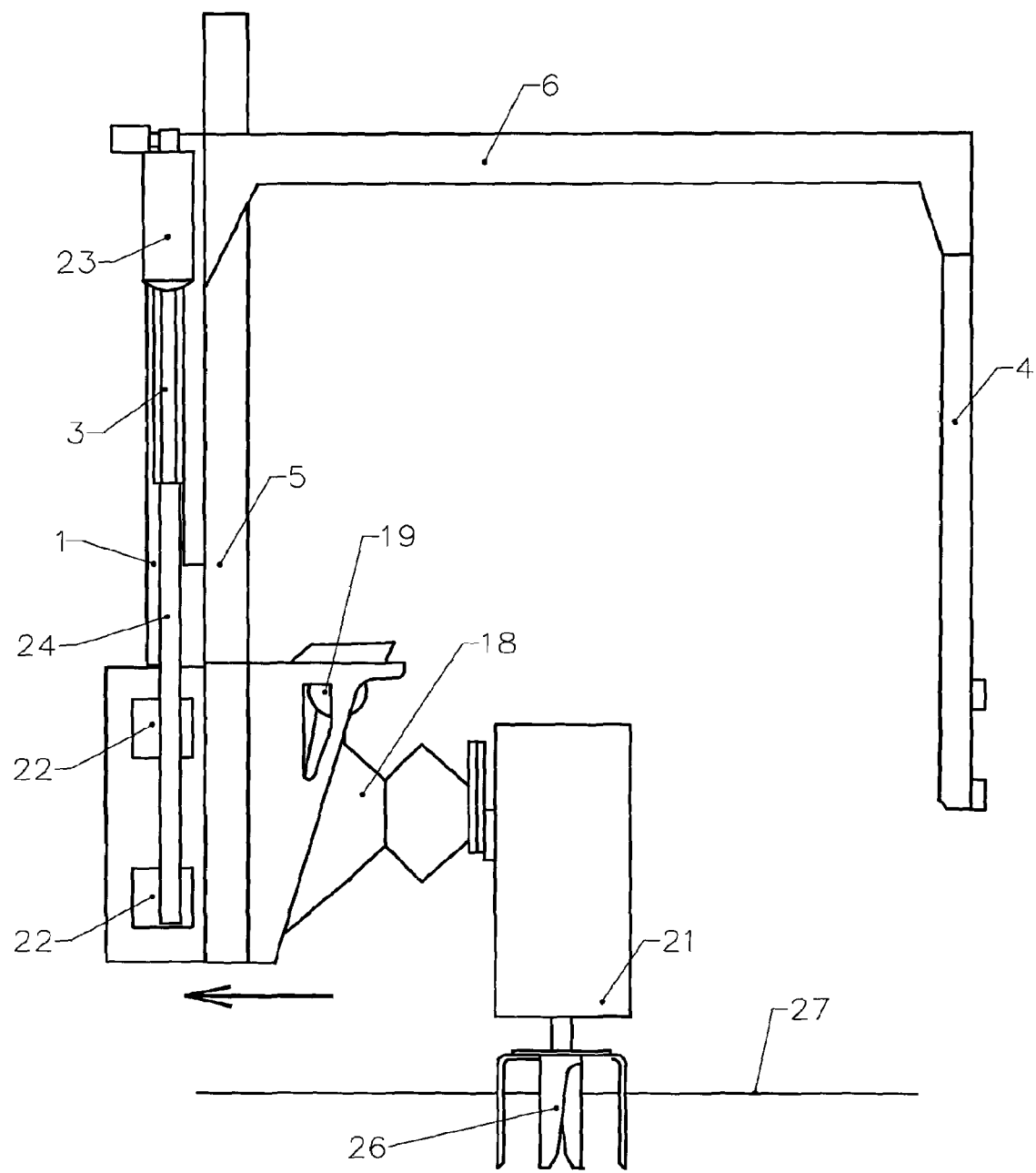
FIG. 9 shows a view of the attachment system with a rotary tiller in operating position.
Figure 10:
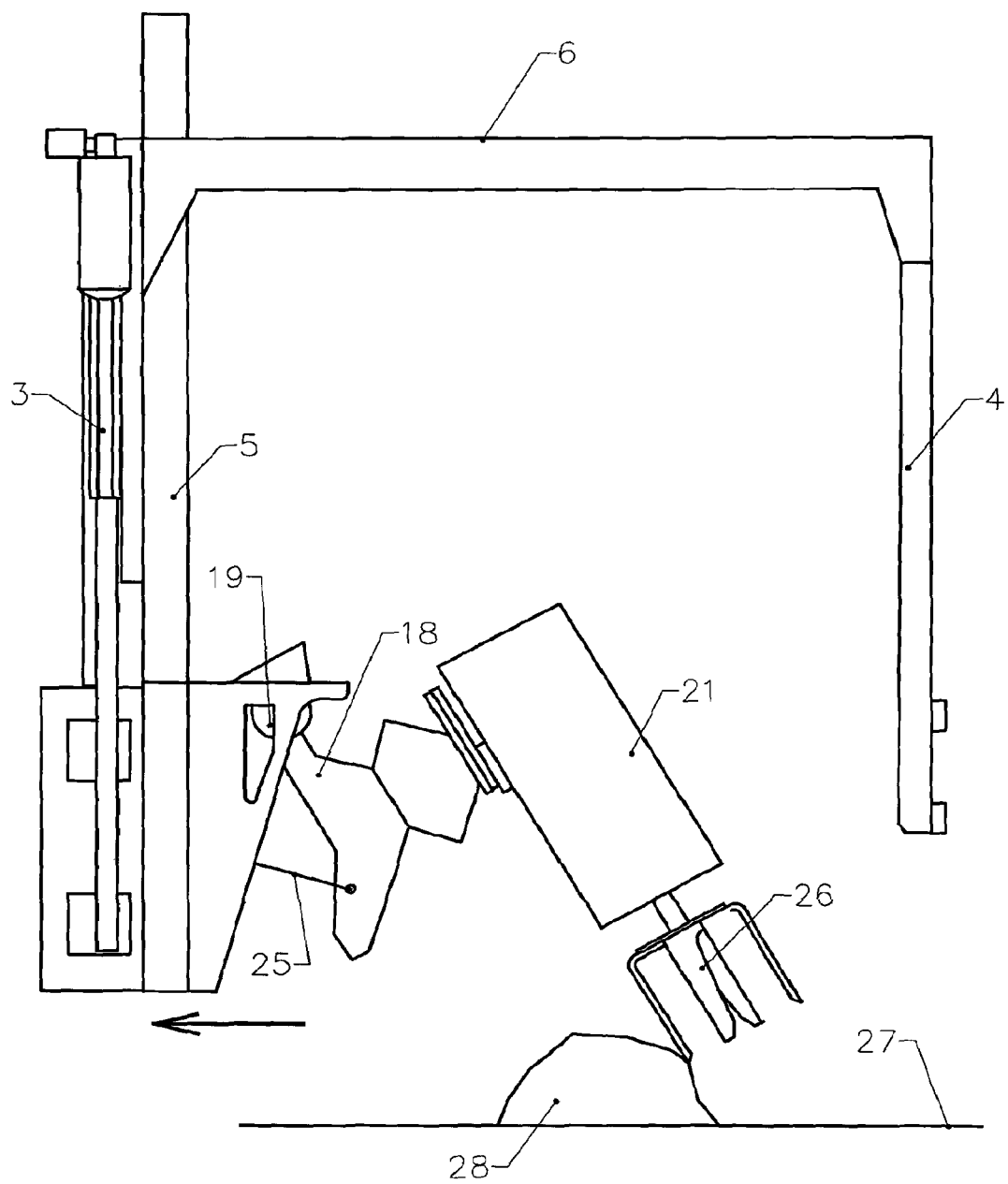
FIG. 10 shows a view of the attachment system with a rotary tiller encountering an obstacle.

FIG. 7 shows an example of how the agricultural implement attachment system is used when installed at the rear end of a vehicle. Herein, hinge element 18 installed on axis 19 of implement bearing frame 2 enables the rotation of the agricultural implement in the vertical plane when an obstacle is encountered. In FIG. 7, hinge element 18 has rod 20 fixed thereon, which enables the movement of agricultural implements in transverse direction. FIG. 9 and FIG. 10, show an example of how rotary tiller 21 can be attached.

Hinge element 18 is connected by cable 25 with tension spring dampers 22 mounted vertically on implement bearing frame 2.

The attachment system for agricultural equipment operates as follows:

The system is attached to a vehicle by means of fastening elements made on plate 7 of mounting frame 1. When traveling on the vehicle, the attachment system has its implement bearing frame 2 hoisted together with the attached agricultural equipment. With the start of operation, implement bearing frame 2 is lowered to operational position (FIG. 1) by synchronous action of lifting devices 3. Lifting devices 3 are also used to adjust the position of agricultural implements over the soil surface. When the vehicle moves, supporting framework 4 with pads 9 carrying a safety device and/or safety sensors precedes the agricultural equipment. Thus, the operational efficiency of the agricultural equipment is enhanced by reducing the frequency of breakdowns and improving human safety in the operational area.

The attachment system can be used for agricultural equipment installed at the front and/or rear end of a vehicle. In the first case, damping device 10 mounted on implement bearing frame 2 is used to maintain the equipment in required position relative to soil surface.

In the second case, hinge element 18 is used to permit turning of agricultural equipment in the vertical plane if an obstacle is encountered. In FIG. 9 and FIG. 10, rotor 26 of tiller 21 moves below soil surface 27 in the direction of the arrow. When it encounters obstacle 28 (FIG. 10), rotor 26 together with hinge element 18 deflects, but after the obstacle is passed spring dampers 22 through cable 25 return it to the previous position.

Other systems for installing agricultural equipment on implement bearing frame 2 can also be used.

INDUSTRIAL APPLICABILITY

The attachment system for agricultural equipment is intended primarily for use on multi-purpose vehicles configured for attaching agricultural implements at the front and/or rear end of a vehicle. The system enhances the operational efficiency of various agricultural implements by providing their accurate matching to soil relief, thus reducing the possibility of implement breakdown, in general, and damage to the mounting system, in particular. The system is the most efficient when operating on electricity, since electrical equipment features a higher response speed than hydraulic one.

The invention claimed is:

1. An attachment system for agricultural equipment comprising:
    a mounting frame with fastening means for attaching the mounting frame to a vehicle;
    an implement bearing frame of an agricultural implement, the implement bearing frame being capable of vertical movement relative to the mounting frame under the action of lifting devices fixed on the sides of the mounting frame; and
    a framework located in front of the agricultural implement for installing at least one safety device;

wherein the implement bearing frame a additionally comprises two levers formable in a vertical plane with the ends of said levers pivotally connected to a horizontal beam, and wherein the horizontal beam is connected to a support framework of the agricultural implement by means of a damper.

2. The attachment system as per claim 1, wherein the mounting frame is equipped with electric connectors for supplying power from the vehicle to lifting devices and the agricultural implement.

3. The attachment system as per claim 1, wherein the framework is fixed on the implement bearing frame.

4. The attachment system as per claim 1, wherein a safety device is installed on the framework.

5. The attachment system as per claim 1, wherein safety sensors are installed on the framework.

6. The attachment system as per claim 1, wherein the implement bearing frame further comprises a cable system configured to lift and lower a rear part of the framework of the agricultural implement.

7. The attachment system as per claim 1, wherein the framework additionally comprises a hinge element enabling rotation of the agricultural implement in the vertical plane when an obstacle is encountered.

8. The attachment system as per claim 7, wherein the hinge element is connected through a cable with tension spring dampers installed vertically on the implement bearing frame.

9. An attachment system for agricultural equipment comprising: a mounting frame with fastening means for attaching the mounting frame to a vehicle;
an implement bearing frame of an agricultural implement, the implement bearing frame being capable of vertical movement relative to the mounting frame under the action of lifting devices fixed on the sides of the mounting frame; and
a framework located in front of the agricultural implement for installing at least one safety device;
wherein the implement bearing frame further comprises a cable system configured to lift and lower a rear part of the framework of the agricultural implement.

* * * * *